United States Patent [19]

Kieser et al.

[11] Patent Number: 5,746,051
[45] Date of Patent: May 5, 1998

[54] DEVICE FOR DETOXIFYING EXHAUST FUMES FROM MOBILE EQUIPMENT

[75] Inventors: Jörg Kieser, Forchheim; Markus Klein, Freiburg; Günter Lins, Erlangen; Robert Seeböck, Bubenreuth; Michael Römheld, Uttenreuth, all of Germany

[73] Assignee: Siemens Aktiengesellschaft, Munich, Germany

[21] Appl. No.: 737,502

[22] PCT Filed: May 10, 1995

[86] PCT No.: PCT/DE95/00619

§ 371 Date: Nov. 8, 1996

§ 102(e) Date: Nov. 8, 1996

[87] PCT Pub. No.: WO95/31271

PCT Pub. Date: Nov. 23, 1995

[30] Foreign Application Priority Data

May 11, 1994 [DE] Germany ............... 44 16 676.1

[51] Int. Cl.$^6$ ............... B01D 53/32; B01D 53/94; F01N 3/02; B01J 19/08
[52] U.S. Cl. ............... 60/275; 60/282; 204/164; 422/186.04
[58] Field of Search ............... 60/275, 282; 204/164, 204/176, 177; 422/186.04

[56] References Cited

U.S. PATENT DOCUMENTS

| | | |
|---|---|---|
| 3,979,193 | 9/1976 | Sikich ............... 96/54 |
| 4,159,425 | 6/1979 | Lowther ............... 422/186.08 |

FOREIGN PATENT DOCUMENTS

| | | |
|---|---|---|
| 366876 | 5/1990 | European Pat. Off. |
| 2140584 | 1/1973 | France |
| 3708508 | 9/1988 | Germany |
| 4028720 | 4/1991 | Germany |
| 63-268911 | 11/1988 | Japan ............... 60/275 |
| 91/02581 | 3/1991 | WIPO |
| 92/19361 | 12/1992 | WIPO |

OTHER PUBLICATIONS

"Patent Abstracts of Japan", vol. 18, No. 357 (C-1221), Jul. 6, 1994, Abstract of JP-6-91138.

Primary Examiner—Tony M. Argenbright
Attorney, Agent, or Firm—Kenyon & Kenyon

[57] ABSTRACT

In automobiles, for example, the exhaust fumes must pass through a plasma reactor operating by the principle of dielectrically inhibited ("silent") discharge, consisting of an arrangement of flat plates with alternating metallic and dielectric layers, whereby a plurality of adjacent discharge paths in parallel in the flow direction are formed. According to the invention, the discharge paths border on a single metallic electrode surface or layer (62, 72) and the electric power is supplied (58, 59) from two different sides with the metallic layers (62, 72) having alternating polarities.

20 Claims, 5 Drawing Sheets

5,746,051

DEVICE FOR DETOXIFYING EXHAUST FUMES FROM MOBILE EQUIPMENT

BACKGROUND OF THE INVENTION

The invention concerns a device for detoxifying exhaust fumes from mobile equipment, wherein the exhaust fumes pass through a plasma reactor operating by the principle of dielectrically inhibited discharge, which consists of an arrangement of flat plates with alternating metallic and dielectric layers, whereby a plurality of adjacent discharge paths arranged in parallel in the flow direction are formed.

Dielectrically inhibited discharges are also referred to as "silent discharges." Such silent discharges are produced between electrodes immersed in a gas, between which there is at least one dielectric layer or a dielectric object so that no direct, i.e., metal-to-metal, discharge is possible.

Prior art devices are known for producing silent discharges. Such devices are often used for ozonization and they normally have a coaxial design. Other prior art devices for obtaining silent discharges have plane-parallel arrangements of electrodes and are used, for example, for generating UV radiation. German Offenlegungsschrift 3,708,508 discloses a device for reducing harmful substances in combustion exhaust fumes, wherein at least one reaction area consisting of parallel metal plates or concentric tubes is provided in the exhaust channel, with at least one plate or one tube of the reaction area being coated with an electrically insulating dielectric material. Furthermore, WO-A-92/19361 discloses such a device, where an exhaust gas is conducted in an annular space between an outer metal cylinder and an inner cylinder made of ceramic material.

The main concern of the above prior art is to clarify the operating principle of the process for detoxifying exhaust fumes by the principle of dielectrically inhibited discharge. They mention both power plants and automobiles without exactly specifying the design of the devices.

Furthermore, in European Patent A-0,366,876, a process with the corresponding alternative devices are described, wherein specifically a glow discharge plasma is used. The corresponding devices can contain alternatively coaxial cylinder arrangements or also plate arrangements using a plurality of porous electrodes in the reactor. Finally, WO-A-91/02581 discloses a device for gas purification specifically consisting of a round housing with a plurality of electrode groups, the first of which serves as a destabilizer, the second as a de-ionizer, and the third group for applying a high-frequency field. The devices described in both documents have a relatively complex design, so that the requirement for compactness cannot be met; the principle of silent discharge is not used in either case.

In particular, for use in mobile equipment, a compact and space-saving design of the plasma reactor is essential. At the same time, however, a large effective electrode surface, specifically a considerable length, must be provided within the reaction area.

Based on the aforementioned prior art and a known plasma reactor with a plurality of adjacent discharge paths, the object of the invention is to provide a great effective length and/or a maximum effective cross section combined with a compact design.

SUMMARY OF THE INVENTION

This object is achieved according to the invention by filling the spaces between the plate-shaped electrodes with gas-permeable insulating material with successive electrodes always having alternating polarities and supplying electric power from different sides.

The plasma reactor of the invention for producing the silent discharge is arranged in a housing with a predefined cross section, in particular with a rectangular cross section. The plasma reactor is made of a discharge vessel delimited by plates made of insulating material, in particular, of ceramic material or of plates coated with insulating material, which form a parallelepiped in the housing. In particular, the area between the housing and the discharge vessel is filled with a filling material. The filling material preferably consists of $Al_2O_3$ fibers.

A predefined number of flat rectangular electrodes, as well as the same number less one of flat rectangular insulating material plates are preferably arranged in parallel with spacers arranged between the electrodes and the insulating material plates, which spacers determine the flashover distance of the silent discharge.

The invention takes advantage of the fact that the electrodes and insulating plates have a flat design, since it is specifically suggested that the electrodes be coated with a permanently adherent, insulating material of even thickness over their entire surface or that an insulating plate be metal plated, which plating then acts as an electrode. The gap between the plate-shaped electrodes can also be filled with insulating material as long as the insulating material is traversed by channels in its cross section. In addition to a porous material, a bundle of insulating fibers filling the area between two electrodes can be used as insulating material. The insulating material can also consist of a ceramic catalyst and/or the metal layers can consist fully or partially of a metal acting as a catalyst.

BRIEF DESCRIPTION OF THE DRAWINGS

Further details and advantages of the invention are elucidated using the drawings of the embodiments.

DETAILED DESCRIPTION OF THE INVENTION

Figure 1:
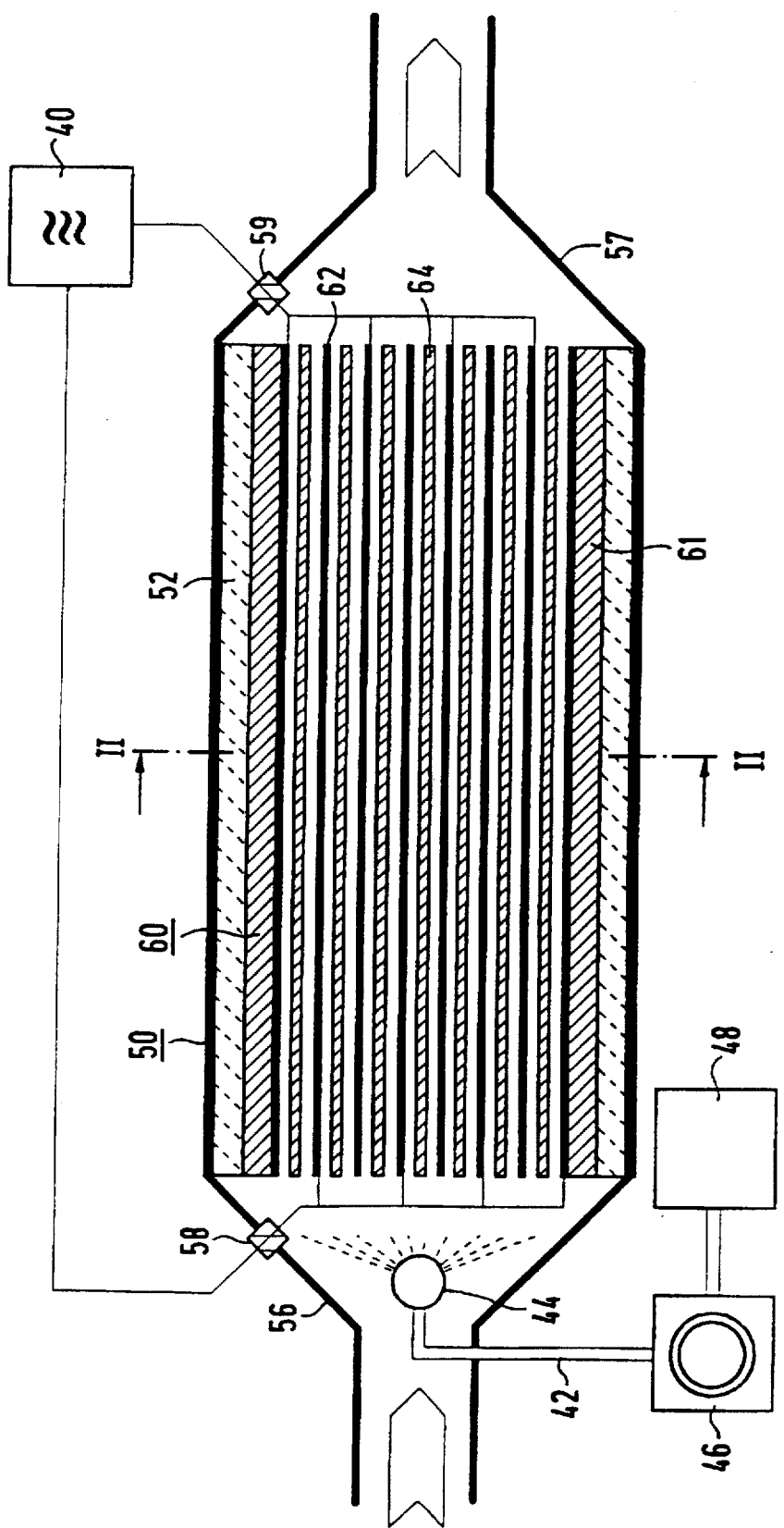
FIG. 1 shows a device for detoxifying exhaust fumes from mobile equipment with a large cross section and compact design.
Figure 2:
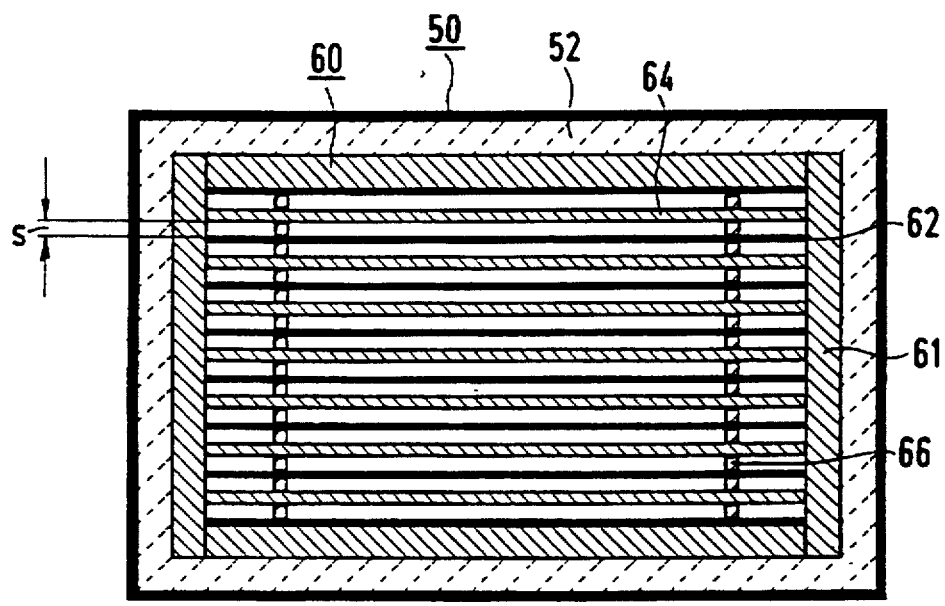
FIG. 2 shows a section of FIG. 1 along the line II/II.

In FIG. 1 a reactor for producing a silent discharge consists of a housing with a generally rectangular cross section according to FIG. 2. A discharge vessel is formed by four insulating plates 61 made of ceramic material, arranged in housing 50 so that their surfaces facing the discharge form the faces of a parallelepiped. The space between housing 50 and discharge vessel 60 is filled with filling material 52, made, for example, of $Al_2O_3$ fibers, which serves as a heat insulation and, in particular for mobile equipment, as a shock absorber.

The discharge vessel contains, for example, an even number of flat rectangular electrodes 62 and the same number less one of flat rectangular insulating plates 64 parallel to one another and arranged in relation to two of the insulating plates 61 forming the discharge vessel so that an insulating plate 64 is located between each pair of electrodes 62. This defines individual discharge paths that are parallel to one another in the flow direction.

FIG. 2 shows that spacers 66 are arranged between each insulating plate 64 and the adjacent electrode 62. These spacers keep electrodes 62 and insulating plates 64 apart at a distance s, which defines the flashover distance of the silent discharge.

Electrodes 62 are connected to a generator 40 so that two adjacent electrodes 62 always have opposite polarities. Reactor 50 has a gas inlet nozzle 56 and a gas outlet nozzle 57 at its ends. Insulating feed-throughs 59 and 56 in housing 50, opposite in relation to alternating electrodes 62, allow power feed-through through the walls of gas inlet and gas outlet nozzles 56 and 57, respectively.

Specifically, gas inlet nozzle 56 has a liquid inlet 42 with a spray head 44 connected to a liquid container 48 through a pump 46. This allows metering a liquid to support or cause certain chemical reactions to occur. This liquid can be, for example, water with or without other chemicals dissolved in it to act as reactants.

During the operation of a system according to FIGS. 1 and 2, reactor 50 is traversed, in general, by hot exhaust fumes such as those formed in an internal combustion engine. By applying a voltage of suitable frequency, signal shape, and amplitude, silent discharges are produced between electrodes 62 and their adjacent insulating plates 64, producing the desired detoxification.

Figure 3:
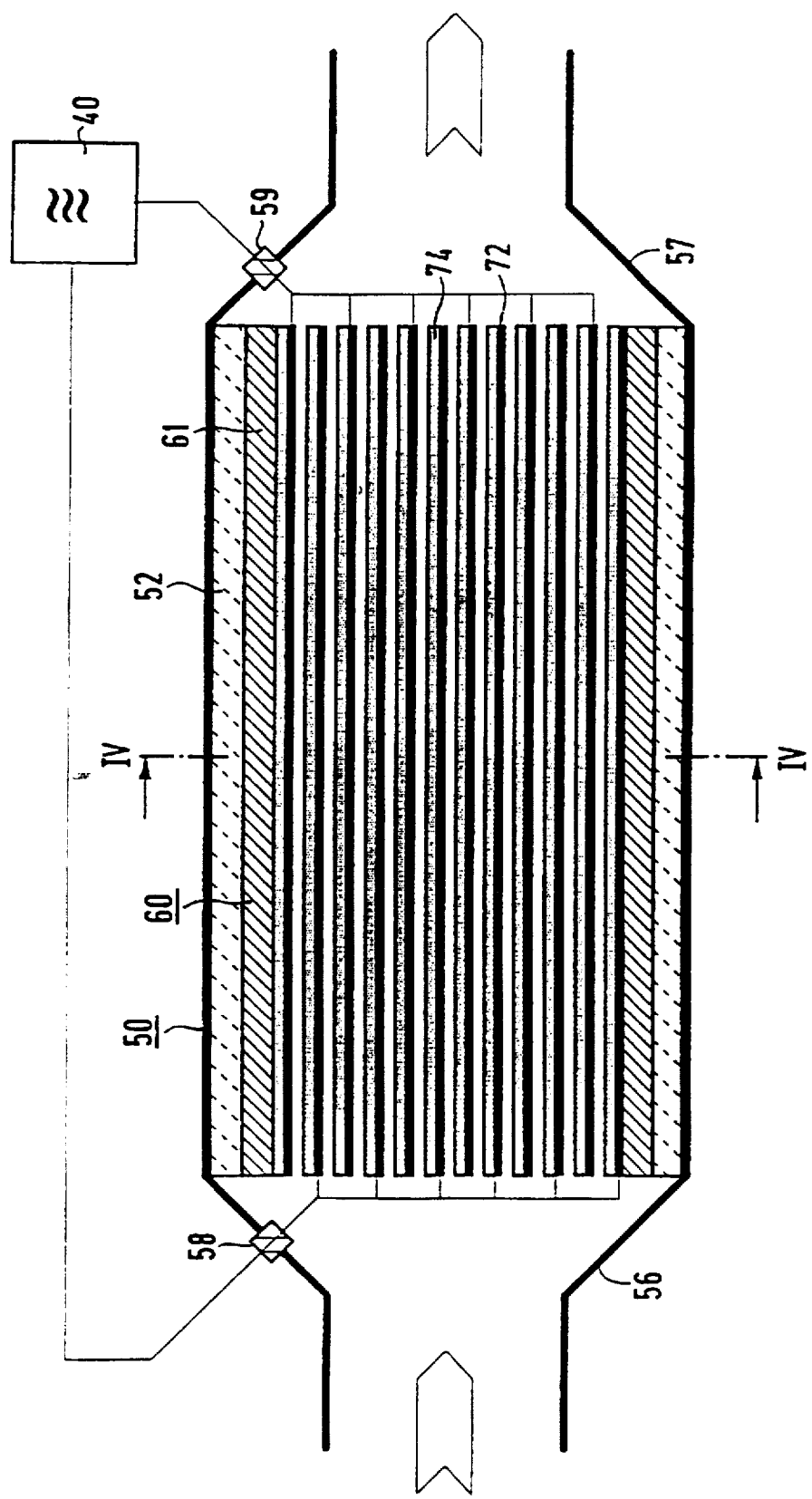
FIGS. 3 and 4 show similar representations of a modified device.
Figure 4:
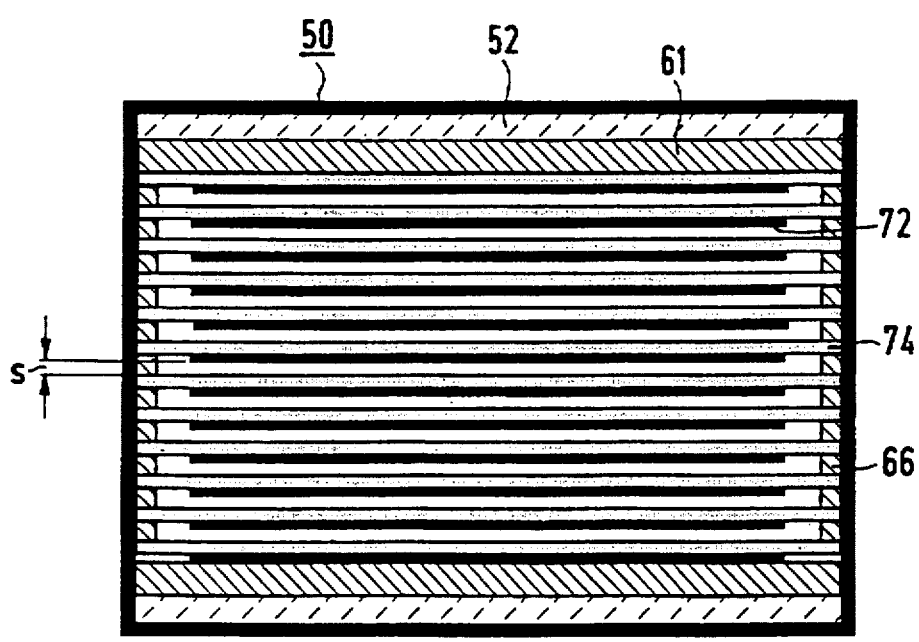

FIGS. 3 and 4 illustrate housing 50 with its discharge vessel according to FIG. 1. In discharge vessel 60, an arbitrary number of flat rectangular ceramic plates 74 are arranged parallel to one another and to two of the insulating plates 61 forming the discharge vessel. Each of ceramic plates 74 is plated on one side with a permanently adherent metal layer 72, of uniform thickness, serving as an electrode. Also in this case, spacers 66 are arranged between two ceramic plates 74 and determine the flashover distance s of the silent discharge. In this case this is the distance between a metallic layer 72 and the adjacent ceramic plate 74.

Reversing the above principle, the insulating layer 74 serving as a dielectric can also be applied as a thin layer onto metallic electrodes 72 in discharge vessel 60. In this case the dielectric layer 74 preferably consists of a material with a large dielectric constant, which is achieved, for example, by using aluminum oxide or a compound of a ferroelectric metal such as barium titanate. The layers can be applied in a thickness of, for example, 100 µm by plasma sputtering. Such dielectric layers 74 can also be produced electrochemically, e.g., by anodizing electrode 72 that is to be coated. The thin layer and/or high dielectric constant make it possible to achieve a high capacitance in either case, allowing optimum power supply.

Figure 5:
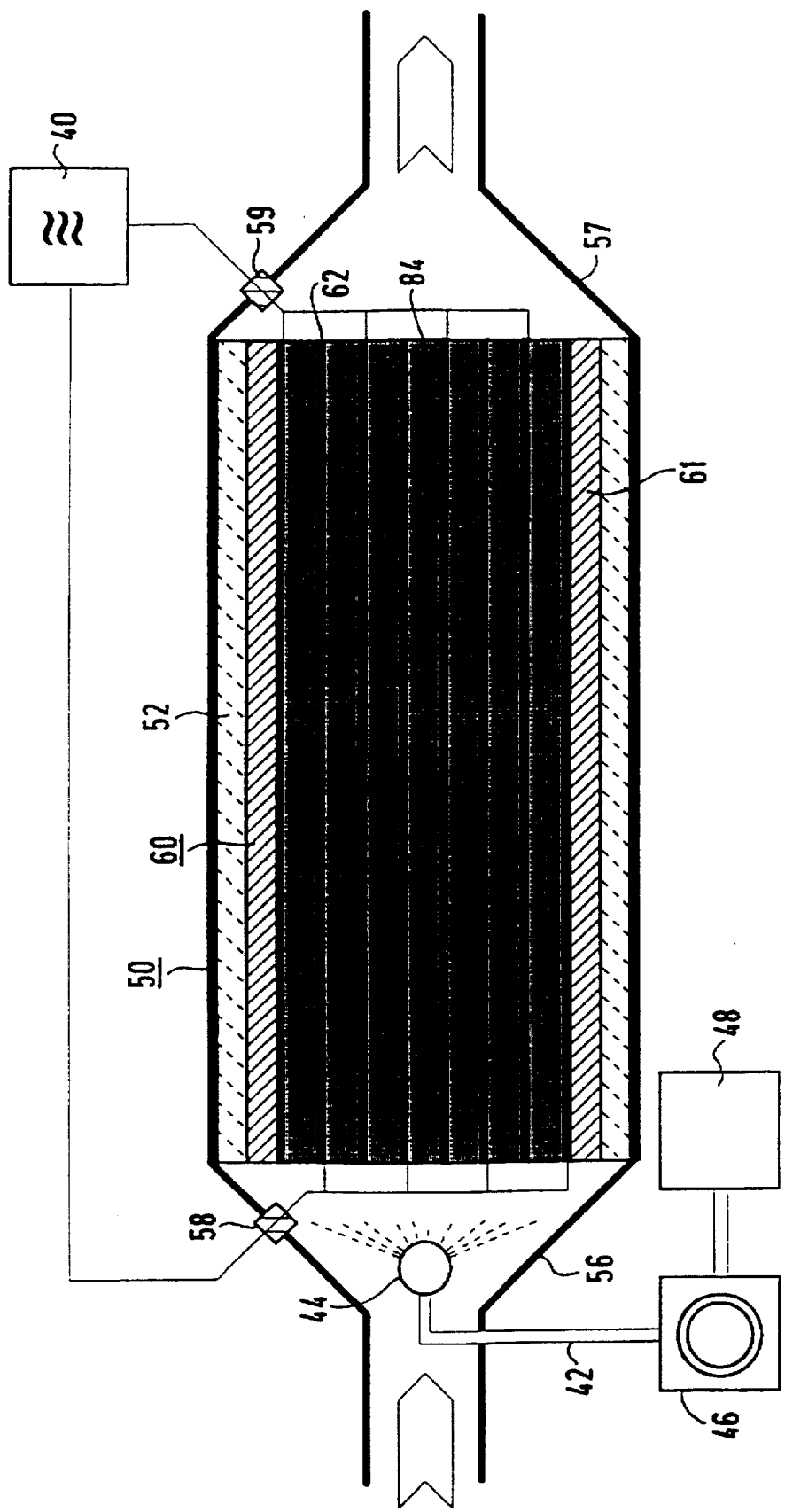
FIG. 5 shows another design of a device according to FIG. 1.

In FIG. 5, housing 50 and discharge vessel 60 have a design similar to those of FIG. 1, and have parallel electrode plates 62. In this case, a specific insulating material 84, completely filling the space between two adjacent electrodes 62, is used instead of insulating plates 64. For the intended purpose, the insulating material is traversed by channels over its entire cross section with each channel extending from the gas inlet side to the gas outlet side. The channels have a cross section of approximately 1 mm², for example.

Differing from the above embodiment, insulating material 84 can also consist of a material containing a large number of randomly distributed interconnected hollow spaces with volumes on the order of 1 mm³, for example. The gas can flow from the inlet side to the gas outlet side of the reactor through such interconnected pores. A bundle of insulating ceramic fibers filling the space between two electrodes 82 can also be used.

Insulating substances made of catalytic material can also be used. Mixtures containing titanium oxide, vanadium oxide and tungsten oxide can specifically be considered for this purpose. The metallic layers can similarly consist, fully or partially, of a metal with catalytic action, platinum being especially suitable for this purpose.

In all the previously described embodiments, the individual metallic layers are brought to a high-voltage potential with alternating polarities by applying a predefinable alternating voltage to the metallic electrodes. Silent discharges are produced in the channels or pores of the insulating material 84 or in the space between the individual fibers in combination with a ceramic layer, with each flashover distance bordering on a maximum of one metallic layer. Suitable electric voltages must be produced for this purpose using generator 40.

In the above-described embodiments, generator 40 can be a pulse generator of the type of transistor or thyristor ignition system used in the automobile industry. The pulse sequence frequency depends on the engine speed. The pulse sequence frequency can, in particular, be an integer multiple of the engine speed and can be between 50 Hz and 5000 Hz, for example. It can normally be regulated and can also be controlled by the measured exhaust fume discharge rate. In all the embodiments described, the electric power is supplied to the individual electrodes from different sides, in particular from opposite sides. This considerably simplifies the design and handling of the plasma reactor.

What is claimed is:

1. A device for detoxifying exhaust fumes from mobile equipment, wherein the exhaust fumes pass through a plasma reactor operating by the principle of dielectrically inhibited discharge, comprising:

an arrangement of flat plates with alternating metallic and dielectric layers, whereby a plurality of adjacent discharge paths arranged in parallel in the flow direction are formed, wherein spaces are defined between the plate-shaped electrodes (72), the spaces being filled with gas-permeable insulating material (84), and wherein successive electrodes (72) always have alternating polarities, the electrodes (72) being adapted to receive electric power from different sides.

2. The device according to claim 1, wherein the space between each pair of plate-shaped electrodes (72) is filled with insulating material (84) that is traversed by channels (85) over its entire cross section.

3. The device according to claim 2, wherein the channels (85) in the insulating material (84) have a cross section of about 1 mm² and wherein each channel (85) extends from a discharge vessel (60) gas inlet nozzle (56) end to a gas outlet nozzle (57) end of the insulating material (84).

4. The device according to claim 2, wherein the insulating material (84) is a porous material containing a large number of randomly distributed interconnected hollow spaces so that a gas can flow from a gas inlet nozzle (56) to a gas outlet nozzle (57) of the discharge vessel (60).

5. The device according to claim 2, wherein a bundle of insulating fibers is used as the insulating material (84), which insulating fibers fill the space between two electrodes (72).

6. The device according to claim 1, further comprising a housing (50), the plasma reactor arranged in the housing (50).

7. The device according to claim 6, wherein the housing has a rectangular cross section.

8. The device according to claim 1, wherein the plasma reactor includes a discharge vessel (60) delimited by at least two other plates (61) made of or coated with an insulating material.

9. The device according to claim 8, wherein four plates (61) made of insulating material, arranged in parallel to the flow direction and enclosing a generally rectangular cross section, delimit the discharge vessel (60).

10. The device according to claim 8, further comprising a housing (50), the plasma reactor arranged within the housing, a space being defined between the housing and the discharge vessel (60), the space being at least partly filled with a filling material (52).

11. The device according to claim 10, wherein the filling material (52) includes $Al_2O_3$ fibers.

12. The device according to claim 8, wherein a number (n) of flat rectangular electrodes (72) and at least the same number less one (n−1) of flat rectangular insulating plates (74) are arranged parallel to one another in the discharge vessel (60).

13. The device according to claim 12, further comprising spacers located between the electrodes (72) and the insulating plates (74), the spacers determining the flashover distance.

14. The device according to claim 9, wherein a plurality of flat rectangular electrodes (72) are arranged parallel to one another in the discharge vessel (60), the electrodes (72) being covered over their entire surface with a permanently adherent insulating layer (74) of uniform thickness.

15. The device according to claim 14, wherein the insulating material (74) is a ceramic catalyst.

16. The device according to claim 15, wherein the ceramic catalyst is a material selected from the group consisting of titanium oxide, vanadium oxide, tungsten oxide, and mixtures thereof.

17. The device according to claim 8, wherein a plurality of flat rectangular insulating plates, coated with a metallic layer serving as an electrode on one side, are arranged parallel to one another in the discharge vessel.

18. The device according to claim 17, wherein the metallic layers include a metal with a catalytic effect.

19. The device according to claim 1, further comprising a means for supplying liquids and chemical reactants to the plasma reactor.

20. The device according to claim 1, further comprising an ignition system electrically connected to the metallic electrode layers, the ignition system is designed as a generator.

* * * * *